United States Patent
Forutanpour et al.

(10) Patent No.: US 10,048,761 B2
(45) Date of Patent: Aug. 14, 2018

(54) CLASSIFICATION OF GESTURE DETECTION SYSTEMS THROUGH USE OF KNOWN AND YET TO BE WORN SENSORS

(71) Applicant: QUALCOMM Incorporated, San Diego, CA (US)

(72) Inventors: Babak Forutanpour, San Diego, CA (US); Geoffrey C. Wenger, San Diego, CA (US); Vitor R. Carvalho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 14/042,660

(22) Filed: Sep. 30, 2013

(65) Prior Publication Data
US 2015/0091790 A1 Apr. 2, 2015

(51) Int. Cl.
*G06F 3/01* (2006.01)
*G06F 3/0487* (2013.01)

(52) U.S. Cl.
CPC .............. *G06F 3/017* (2013.01); *G06F 3/011* (2013.01); *G06F 3/015* (2013.01); *G06F 3/0487* (2013.01); *G06F 2203/0381* (2013.01)

(58) Field of Classification Search
None
See application file for complete search history.

(56) References Cited

U.S. PATENT DOCUMENTS

| | | | |
|---|---|---|---|
| 2005/0210418 A1* | 9/2005 | Marvit | G06F 3/0346 715/863 |
| 2010/0188328 A1 | 7/2010 | Dodge et al. | |
| 2011/0310005 A1 | 12/2011 | Chen et al. | |
| 2012/0212400 A1* | 8/2012 | Border et al. | 345/8 |
| 2012/0257035 A1* | 10/2012 | Larsen | G06F 3/017 348/78 |
| 2012/0280905 A1 | 11/2012 | Vonog et al. | |

(Continued)

FOREIGN PATENT DOCUMENTS

WO   WO-2011160079 A1   12/2011

OTHER PUBLICATIONS

International Search Report and Written Opinion—PCT/US2014/058073—ISA/EPO—dated Dec. 10, 2014.

*Primary Examiner* — Nicholas J Lee
*Assistant Examiner* — Duane N Taylor, Jr.
(74) *Attorney, Agent, or Firm* — Arent Fox, LLP

(57) ABSTRACT

An apparatus, a method, and a computer program product for gesture recognition. The apparatus classifies a gesture based on a movement of a body part as detected by a primary sensor. The apparatus determine a reliability level of a secondary sensor and obtains corroborating information associated with the movement of the body part using the secondary sensor when the reliability level satisfies a criterion. The apparatus then confirms or negates the classification of the gesture based on the corroborating information. The secondary sensor may be a sensor already known to the apparatus, i.e., the sensor is currently being worn by the user, or it may be a sensor that is worn by a user at a later time. In the latter case, the apparatus detects for the presence of a new sensor, determines the gesture recognition capabilities of the new sensor and integrates the new sensor into the gesture recognition process.

37 Claims, 5 Drawing Sheets

(56) References Cited

U.S. PATENT DOCUMENTS

2013/0229508 A1 9/2013 Li et al.
2014/0310764 A1* 10/2014 Tippett .................... G06F 21/31
　　　　　　　　　　　　　　　　　　726/1

* cited by examiner

CLASSIFICATION OF GESTURE DETECTION SYSTEMS THROUGH USE OF KNOWN AND YET TO BE WORN SENSORS

BACKGROUND

Field

The present disclosure relates generally to gesture recognition, and more particularly to the classification of gesture detection systems through use of known and yet to be worn sensors.

Background

Systems and applications for implementing augmented reality (AR) have become very popular and widespread. AR systems typically include a head mounted display (HMD) that allow users to simultaneously see and interact with their surroundings while interacting with applications, such as e-mail and media players. Although many AR applications may be run on smartphones and tablets, the most natural form factor for implementing AR systems are optical devices, such as glasses.

Some AR systems provide for gesture activation of applications and selection of files and documents, wherein activation or selection occurs in response to different motions of a hands or fingers present within the field of view of the AR glasses. Such methods, however, suffer from significant drawbacks with respect to gesture detection accuracy. For example, conventional systems that rely on a camera may track hand gestures with varying levels of accuracy due to poor lighting or slow frame rate. Accordingly, it is desirable to improve the accuracy of gesture detection and classification.

SUMMARY

An apparatus, a method, and a computer program product for gesture recognition are provided. An apparatus classifies a gesture based on a movement of a body part as detected by a primary sensor. The apparatus determine a reliability level of a secondary sensor and obtains corroborating information associated with the movement of the body part using the secondary sensor when the reliability level satisfies a criterion. The apparatus then confirms or negates the classification of the gesture based on the corroborating information. The secondary sensor may be a sensor already known to the apparatus, i.e., the sensor is currently being worn by the user, or it may be a sensor that is worn by a user at a later time. In the latter case, the apparatus detects for the presence of a new sensor, determines the gesture recognition capabilities of the new sensor and integrates the new sensor into the gesture recognition process.

DETAILED DESCRIPTION

Figure 1:
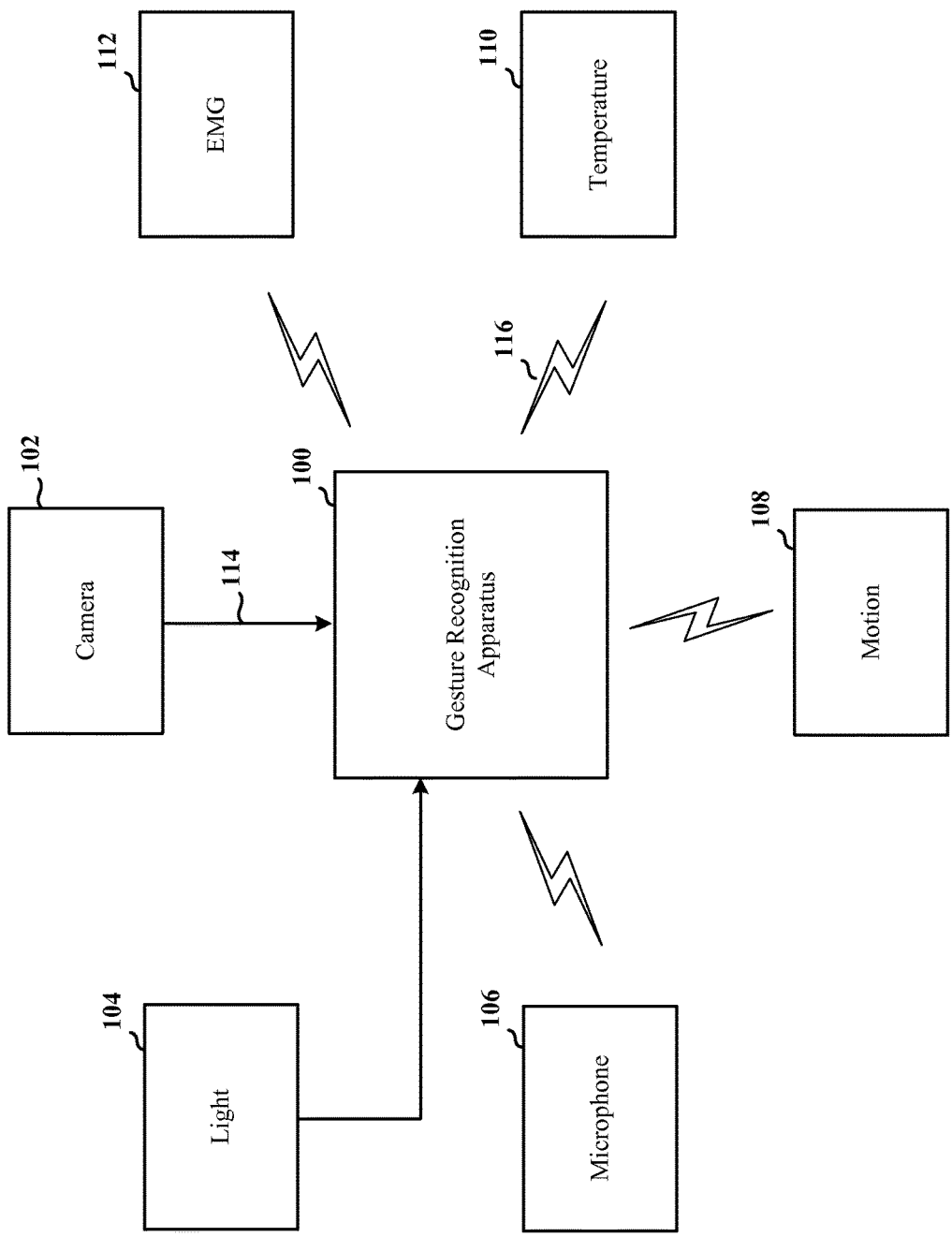
FIG. 1 is a diagram illustrating a gesture recognition apparatus and different types of sensors that may be used by the apparatus to classify gestures.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of a gesture recognition apparatus will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating a gesture recognition apparatus 100 along with various different sensors that may be used by the apparatus to classify gestures. The sensors may include, for example: a visual sensor 102, such as a camera; a light sensor 104; a sound sensor 106, such as microphone; a motion sensor 108; a temperature sensor 110; and an electromyography (EMG) sensor 112. The foregoing sensors are a representative sample of sensor types that may be employed by the gesture classification apparatus. Other types of sensors may be employed. The sensors may provide sensor signals and otherwise communicate with the gesture recognition apparatus through wired 114 or wireless 116 connections, such as Bluetooth.

The gesture recognition apparatus 100 is dynamic in that it may employ different sensors at different times, depending on sensor availability. To this end, the gesture recognition apparatus 100 is configured to detect for the presence of new and existing sensors. For example, a user of the gesture recognition apparatus 100 may not be wearing a motion sensor at the time of initial use of the apparatus, but may at a later time begin to wear one. Accordingly, the apparatus 100 periodically scans for sensors. Such scanning may occur through Bluetooth, WiFi, WiFI Direct and Cellular. If a prior existing sensor is no longer available, or a new sensor becomes available, the gesture recognition apparatus 100 adjusts its operation accordingly. Such adjustments are described further below.

Figure 2:
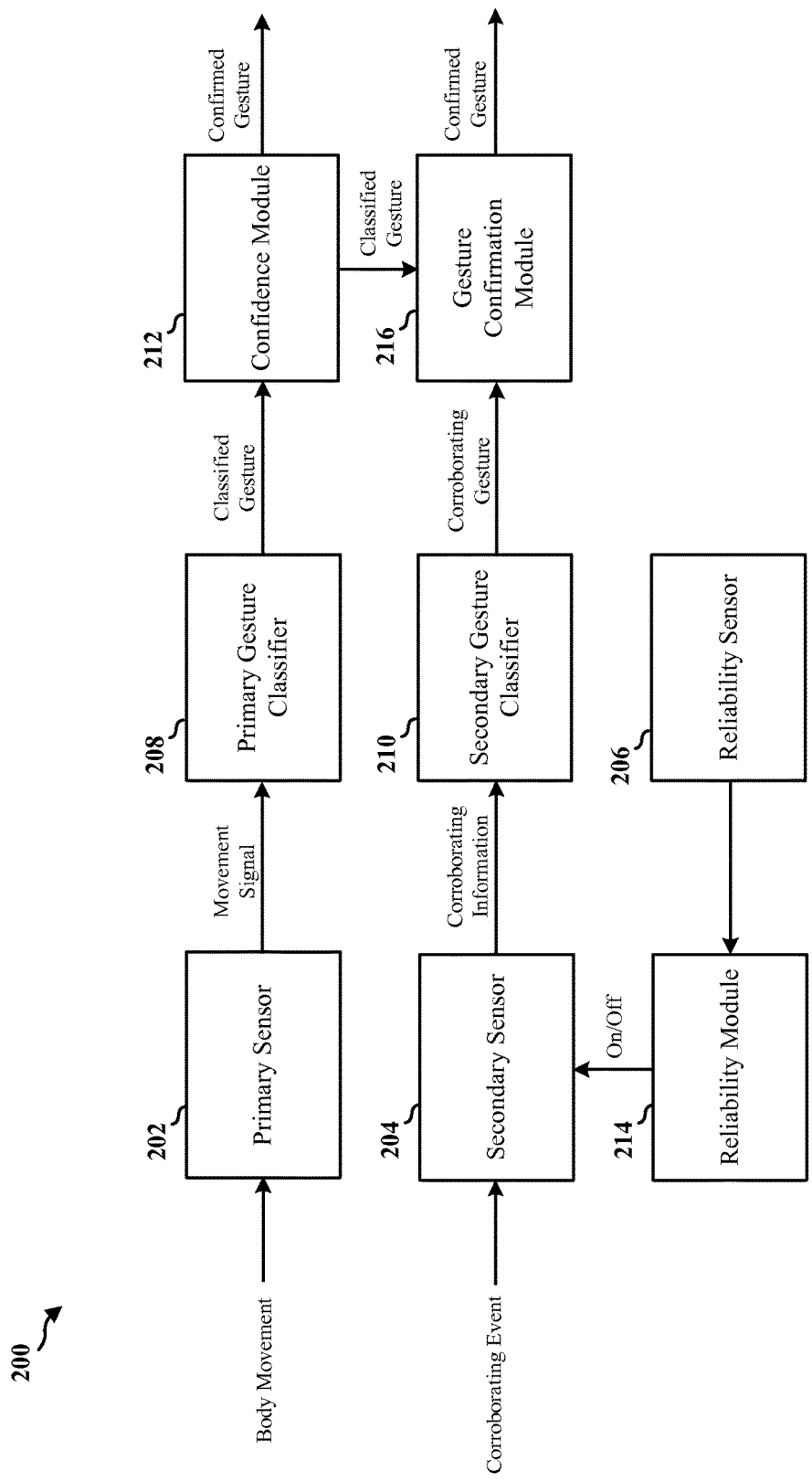
FIG. 2 is a flow diagram illustrating the operation of different modules/means/components in a gesture recognition apparatus.

FIG. 2 is a diagram illustrating a gesture recognition apparatus 200 receiving signals from three different sensors, including a primary sensor 202, a secondary sensor 204 and a reliability sensor 206. The gesture recognition apparatus 200 is configured to output gesture classifications corresponding to movements of a body part. The gesture recognition apparatus 200 processes gesture events, including for example, body motion, body images, and body sounds, sensed by one or more sensors, in a manner that improves overall accuracy of the gesture classifications outputted by the apparatus 200.

Each of the sensors 202, 204, 206 may be co-located with the gesture recognition apparatus 200 or may be located separate from the apparatus. For example, the gesture recognition apparatus 200 may be included in a pair of AR glasses worn by a user. The AR glasses may include a camera that may function as the secondary sensor 204, and a light sensor that may function as the reliability sensor 206. The user of the AR glasses may wear an additional apparatus that may include the primary sensor 202. For example, the additional apparatus may be a wristband worn by the user.

The gesture recognition apparatus 200 includes a primary gesture classifier 208, a secondary gesture classifier 210, a confidence module 212, a reliability module 214 and a gesture confirmation module 216. In one configuration, the primary sensor 202 is configured to sense body movement and output a corresponding movement signal to the primary gesture recognition device 208. The primary sensor 208 may be an EMG sensor or a pressure sensor that detects body movement.

The primary gesture classifier 208 processes the movement signal and classifies the body movement as one of a number of gestures supported by the gesture recognition apparatus 200. For example, the primary gesture classifier 208 may include a look up table of gestures, whereby particular gestures are mapped to particular characteristics of movement signals. In this case, the primary gesture classifier 208 processes the received movement signals, extracts signal characteristics, e.g., frequency, amplitude, shape of curve, slope, minimum, maximum, hysteresis, mean, median, standard deviation, variance, acceleration and looks for a matching signal characteristics in the look up table. The gesture mapped to the matching signal characteristics is determined by the primary gesture classifier 208 to be the gesture detected by the primary sensor. Accordingly, the primary gesture classifier 208 outputs an indication of the detected gesture, referred to in FIG. 2 as a "classified gesture."

The confidence module 212 receives the indication of the classified gesture from the primary gesture classifier 208 and determines the confidence level of this gesture based on a look up table. The confidence look up table includes a listing of gestures that may be classified based on movement signals obtained from the primary sensor 202 and corresponding measures of confidence that the classified gesture provided by the primary gesture classifier 208 in response to the movement signal is accurate. For example, a particular sensor, such as an EMG sensor, may be more accurate at detecting finger snap than at detecting a hand wave. Accordingly, the look up table for that sensor would have a higher level of confidence when the classified gesture is a finger snap, than when the classified gesture is a hand wave. The confidence look up table may be based on available information for the sensor type corresponding to the primary sensor 202 or it may be based on past errors in classified gesture determinations made by the primary gesture classifier 208 in response to movement signals from the primary sensor 202.

Upon determination of the confidence level corresponding to the classified gesture, the confidence module 212 compares the confidence level to a threshold. If the threshold is satisfied, the gesture recognition apparatus 200 outputs the classified gesture as a confirmed gesture. If the threshold is not satisfied, a gesture confirmation process is initiated, in which case the classified gesture output by the primary gesture classifier 208 is provided to the gesture confirmation module 216 for further processing, as described below.

Regarding confidence levels and thresholds, in one implementation, these measures are represented by percentages. For example, the threshold may be programmed to 98%. In this case, the confidence module 212 compares the confidence level percentage of the classified gesture to the threshold percentage. If the confidence level satisfies the threshold, e.g., exceeds, equals or exceeds, etc., then the classified gesture is output by the gesture recognition apparatus 200 as the confirmed gesture. If the confidence level is below the threshold then the gesture confirmation process is initiated. Through programming it is possible to bypass the gesture confirmation process. For example, in one configuration, the gesture confidence level of all gestures may be set to 100%. Alternatively, the threshold may be set to zero so that the threshold is always satisfied.

In cases where the gesture confirmation process is initiated, the gesture recognition apparatus 200 may activate the secondary sensor 204. The secondary sensor 204 may be any sensor that captures a corroborating event related to the body movement sensed by the primary sensor 202. For example, the secondary sensor 204 may be a camera configured to capture an image of the body movement, or a microphone configured to capture sound associated with the body movement.

In an alternative configuration, the gesture recognition apparatus 200 may first determine that information provided by the secondary sensor 204 is reliable. In this case, the gesture recognition apparatus 200 activates the reliability sensor 206 and delays activation of the secondary sensor 204 until reliability of the secondary sensor is confirmed.

The secondary sensor reliability module 214 evaluates if the data provided by the secondary sensor 204 is reliable based on input received from the reliability sensor 206. For example, if the secondary sensor 204 is a camera, the reliability sensor 206 may be a light detector. In this case the reliability module 214 evaluates how much light is in the room. If the light level satisfies a threshold, such as a specific number of lumens, then the reliability module 214 concludes that the data from the secondary sensor is reliable. As another example, if the secondary sensor 204 is a sound detector, the reliability sensor 206 may be a microphone. In this case, the reliability module 214 evaluates the sound level in the vicinity of the secondary sensor 204. If the sound level satisfies a threshold indicative of an environment that is not too loud or noisy, such as below a specific number of decibels, then the reliability module 214 concludes the secondary sensor 204 is an effective sensor and the data from the secondary sensor is reliable.

Upon determining that the secondary sensor 204 is reliable, the gesture recognition apparatus 200 turns on the secondary sensor 204. Corroborating information is captured by the secondary sensor 204 and provided to the secondary gesture classifier 210. The secondary gesture classifier 210 processes the corroborating information and classifies the body movement associated with the corroborating information as one of a number of gestures supported by the secondary gesture classifier 210. For example, the secondary gesture classifier 210 may include a look up table of gestures, whereby particular gestures are mapped to particular characteristics of images captured by a camera or sounds captured by a sound detector. In this case, the secondary gesture classifier 210 processes the received corroborating information, extracts appropriate characteristics, e.g., presence of edges, intensity histograms, color gradients, etc, in the case of an image; and fundamental frequency, crossing rate, rolloff, spectrum smoothness and spread, etc. in the case of sound, and looks for a matching characteristics in the gesture look up table. The gesture mapped to the matching characteristics is determined by the secondary gesture classifier 108 to be the gesture detected by the secondary sensor. Accordingly, the secondary gesture classifier 210 outputs an indication of the detected gesture, referred to in FIG. 2 as a "corroborating gesture."

The secondary gesture classifier 210 provides the corroborating gesture to the gesture confirmation module 216. The classified gesture provided by the primary gesture classifier 208, through the confidence module 212, and the corroborating gesture provided by the secondary gesture classifier 210 are processed to determine a confirmed gesture. In one configuration, the confirmation module 216 compares the classified gesture and corroborating gesture to determine if they are the same gesture. If the two gestures match, then the matching gesture is output as the confirmed gesture. If the two gestures do not match, then a gesture determination error is output by the gesture detection apparatus 200.

The confidence module 216 may also output a confirmed gesture based on respective confidence levels of the primary gesture classifier 208, secondary gesture classifier 210 and any additional sensors and corresponding gesture classifiers that may be added to the system. For example, in the case of a primary gesture classifier paired with a primary sensor in the form an EMG sensor wrist band, a secondary gesture classifier paired with a second sensor in the form of a microphone, and a third gesture classifier paired with a Fitbit that senses motion of the hips, the system considers all gesture classifications it receives and may make a confirmed gesture decision based on which gesture classification has the highest confidence level. For example, if the primary gesture classifier is 90% confident the gesture is a snap, the secondary gesture classifier is 60% confident the gesture is snap and the third gesture classifier is 10% confident the gesture is a hand wave hello, the system outputs a snap as the confirmed gesture. In another configuration, perhaps when all confidence levels are substantially the same, the system may determine a confirmed gesture based on majority rule.

In one example implementation, the subject gesture is a pinch formed by the thumb and index figure of a user and the primary sensor 202 is an EMG sensor. Based on a movement signal provided by the EMG sensor, the primary gesture classifier 208 determines the gesture is a pinch. The confidence level of this gesture does not satisfy a confidence threshold. Accordingly, the gesture recognition apparatus 200 activates the secondary sensor 204, which is a camera, to confirm the gesture detection. Based on information received from a reliability sensor 206, which may be a light detector included in the camera, the reliability module 214 determines if the room is well lit based on, for example, a threshold number of lumens, such as 500 lumens for a typical office. If the room is well lit, the camera 204 takes a picture and the secondary gesture classifier 210 processes the picture to determine if the picture evidences an index finger and thumb brought together to create a circle indicative of a pinch. Processing the picture may involve skin tone detection to look for skin, which serves as an indication that the user brought his hand in front of camera to do gesture, or Hough Line Transform which looks for lines, i.e. edges of fingers. If the secondary gesture classifier 210 determines a pinch, then the gesture confirmation module 216 outputs a pinch as a confirmed gesture based on a match between the classified gesture and the corroborating gesture.

In another example implementation, wherein the gesture is a pair of sequential finger snaps and the primary sensor 202 is a pressure-sensitive band on the back of the palm. Based on a movement signal provided by the pressure-sensitive band, the primary gesture classifier 208 determines the gesture is a snap, e.g., the first snap in the pair of snaps. The confidence level of this gesture does not satisfy a confidence threshold. Accordingly, the gesture recognition apparatus 200 initiates a gesture confirmation process. In this process, the apparatus 200 activates the reliability sensor 206, which is a microphone, prior to activating the secondary sensor. A signal corresponding to sound captured by the microphone in the vicinity of where the first snap occurred is provided to the reliability module 214. The reliability module 214 processes the sound signal to determine if the vicinity wherein the first snap occurred is too loud, e.g., the sound level is above a threshold decibel level. If the room is determined not to be too loud, the gesture recognition apparatus 200 turn on the secondary sensor 204, which is a microphone.

The secondary sensor microphone 204 captures the sound in the vicinity of the gesture and the secondary gesture classifier 210 processes the sound (e.g., DSP processing) to determine if the sound evidences a finger snap, e.g., the second snap. If the secondary gesture classifier 210 determines a snap, then the gesture confirmation module 216 outputs a snap as a confirmed gesture based on a match between the classified gesture and the corroborating gesture.

In the foregoing example, the secondary sensor 204 and the reliability sensor 206 are both microphones and may be the same microphone. The distinction between the sensors 204, 206 in this case is the level of sophistication in the processing of the sounds performed by the reliability module 214 and the secondary gesture classifier 210, respectively. In the case of the reliability module 214, the sound processing relates to loudness, which involves determining a decibel level. In the case of the secondary gesture classifier 210, the sound processing relates to signal characteristics related to gestures, such as obtaining the frequency domain of the sound via FFT and comparing primary frequency to the primary frequency of snaps of the user recorded during training, which involves more complex digital signal processing. Accordingly, a delay in activation of complex digital signal processing until a sound level criterion is met may result in system efficiencies in terms of power and processing consumption.

The gesture recognition apparatus 200 described with reference to FIG. 2 includes a primary sensor, a secondary sensor and a reliability sensor. These sensors may be considered in terms of functionality, in combination with other components of the apparatus 200, and may not necessary correspond to different physical sensors. For example, in the case of sound sensing, the same microphone may be used to capture the sound processed by the reliability module and the sound processed by the secondary gesture classifier. In this case, the primary sensor and the secondary sensor are the same component. In other cases, each of the sensors may be based on a different underlying technology, EMG, image sound, pressure, motion, etc.

A gesture recognition apparatus 200 may have more than three sensors, each of which may be based on a different underlying technology. The apparatus 200 may have flexibility is designating different sensors as the primary sensor, second sensor and reliability sensor. In one configuration, sensors may be designated to achieve an order of operation whereby sensors with lower power draw are used first. For example, an EMG sensor draws far less current than a camera. Accordingly, the EMG sensor may be designated the primary sensor that is used to determine a classified gesture, while the camera is designated the secondary sensor and is used only when a corroborating gesture is needed.

The data and results from the secondary gesture classifier 210 may help improve the performance of the primary gesture classifier 208 through re-training. For example, if a primary sensor, e.g., EMG sensor, provides a movement signal upon which the primary gesture classifier 208 determines the gesture is a pinch or snap, but the secondary sensor 204, e.g., camera, provides corroborating information upon which the secondary gesture classifier 210 determines the gesture is a pinch, then it may be beneficial to update or retrain the primary gesture classifier. To this end, the EMG data captured at that time, i.e., the movement signal, is fed back into the primary gesture classifier 208 and the gesture look up table of the primary gesture classifier mapping movement signal characteristics to gestures is updated so that sensing of EMG signals that used to result in detections of pinches or snaps by the primary gesture classifier, are now detected more accurately only as pinches.

The gesture recognition apparatus 200 may be configured to pair with sensors that become available at a later time. For example, if a user of the gesture recognition apparatus 200 begins to wear a pedometer, the system may benefit from information available from the pedometer. The apparatus 200 may detect the presence of the new sensor and determine its capabilities. Based on these capabilities the system may implement additional features of the gesture determination process. In the case of the pedometer, upon recognition of the pedometer, the gesture recognition apparatus 200 may implement a feature whereby the pedometer functions as a reliability sensor 206 with respect to an EMG primary sensor 202. When the pedometer indicates to the reliability module 214 that the user is walking, the reliability module causes the apparatus to ignore the output of any gesture classifiers that are derived from signals provided by the EMG sensor. This is based on the premise that walking results in noisy EMG signals due to unstable electrical ground, which in turn result in inaccurate EMG based gesture determinations.

In an example scenario of adding new sensor capability, the gesture recognition apparatus 200 periodically looks for new devices using well know technology, such as AllJoyn. When a new device is turned on, the apparatus 200 recognizes the device and connects to the device, for example, through some open standard. Once connected, the apparatus 200 queries the device for available data from sensors included in the device. As the user of the new device does various gestures, the apparatus 200 looks for patterns in the data stream from these new sensors.

If the classifier components 208, 210 of the apparatus 200 find relationships between data provided by the new sensor and corresponding gestures, such correspondences will be added to the gesture look up table of the classifier so the new sensor may be used as a sensor in the gesture classification apparatus 200. For example, in the case of a device that is strapped in the user's arm and provides data corresponding to motion, the classifier may find that every time the user does a snap, the device provides a movement signal that is repeatable and consistent. Likewise, if the classifier components 208, 210 of the apparatus 200 do not find relationships between data provided by the new sensor and corresponding gestures the system will ignore data from the new sensor. For example, if the new sensor is a temperature sensor that reports temperature, but the apparatus 200 determines that no temperature change is associated with a snap gesture, then temperature data will be ignored by the apparatus.

Figure 3:
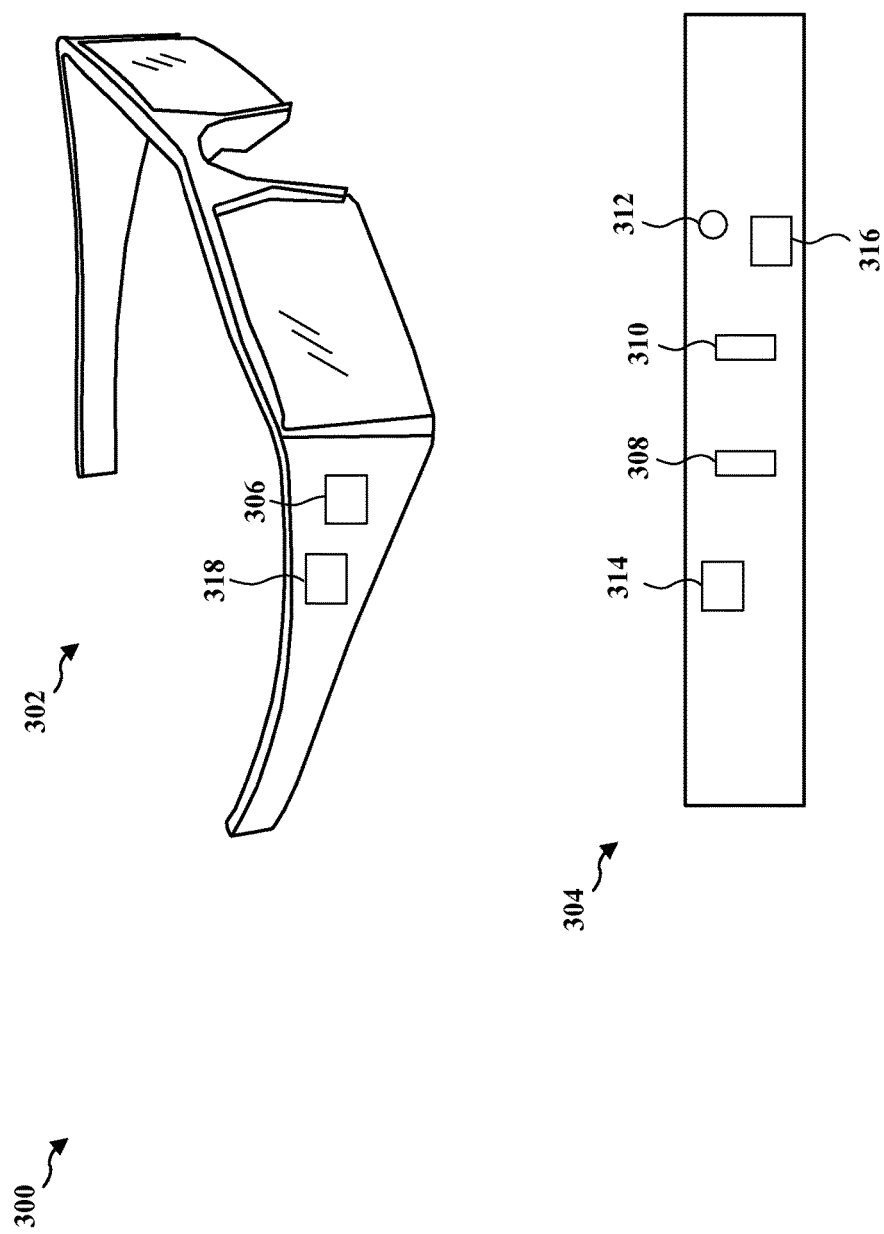
FIG. 3 is an illustration of an AR system including a pair of AR glasses and a gesture recognition wristband.

FIG. 3 is an illustration of an AR system 300 that includes an AR device 302 in the form of pair of AR glasses, and a gesture sensor device 304 in the form of a wristband. The AR glasses 302 may be configured to project content through its lenses using methods known in the art. For example, the AR glasses 302 may be configured to project application content through its lenses, such as e-mails, documents, web pages, or media content such as video games, movies or electronic books. Other types of AR devices 302 may include Smartphones, tablets, laptops, etc.

The AR glasses 302 include a communications device 306 for communicating with the gesture sensor device 304. The communications device 306 may be, for example, a Bluetooth device. The AR glasses 302 further include a processor 318 for processing signals received from the gesture sensor device 304. The processor 318 may include one or more of the components of the gesture recognition apparatus 200 shown in FIG. 2.

The gesture sensor device 304 is configured to be associated with a body part and may be any form conducive to provide such association. For example, if the body part is a hand or finger, the gesture recognition device may be configured as a wristband 304.

The gesture sensor device 304 may include one or more sensors of the gesture recognition apparatus shown in FIG. 2. For example, in one configuration, the gesture sensor device 304 includes the primary sensor 202 in the form of a pair of electrodes 308, 310 that provide EMG sensing capability. The electrodes 308, 310 are preferably positioned on the wristband such that when the user is wearing the wristband 304 the electrodes are located so as to sense electrical activity resulting from muscular movement of the wrist. The electrodes 308, 310 in combination with an EMG sensing element (not shown), function as an EMG sensor that provides signals indicative of movement of a body part. EMG sensing capability is based on well known technology.

The gesture sensor device 304 may include other types of sensors, such as a motion sensor 312 or a pressure sensor 314, which may function as the primary sensor. The motion sensor 312 may be positioned anywhere on the wristband and provides signals indicative of movement of the body part. The indications provided may be one of general overall movement of the body part or finer movement of the body part corresponding to a gesture. The motion sensor 312 may be, for example, an accelerometer, gyroscope, or magnetometer. The gesture sensor device 304 also includes a communication device 316 for communicating with the AR glasses 302.

Figure 4:
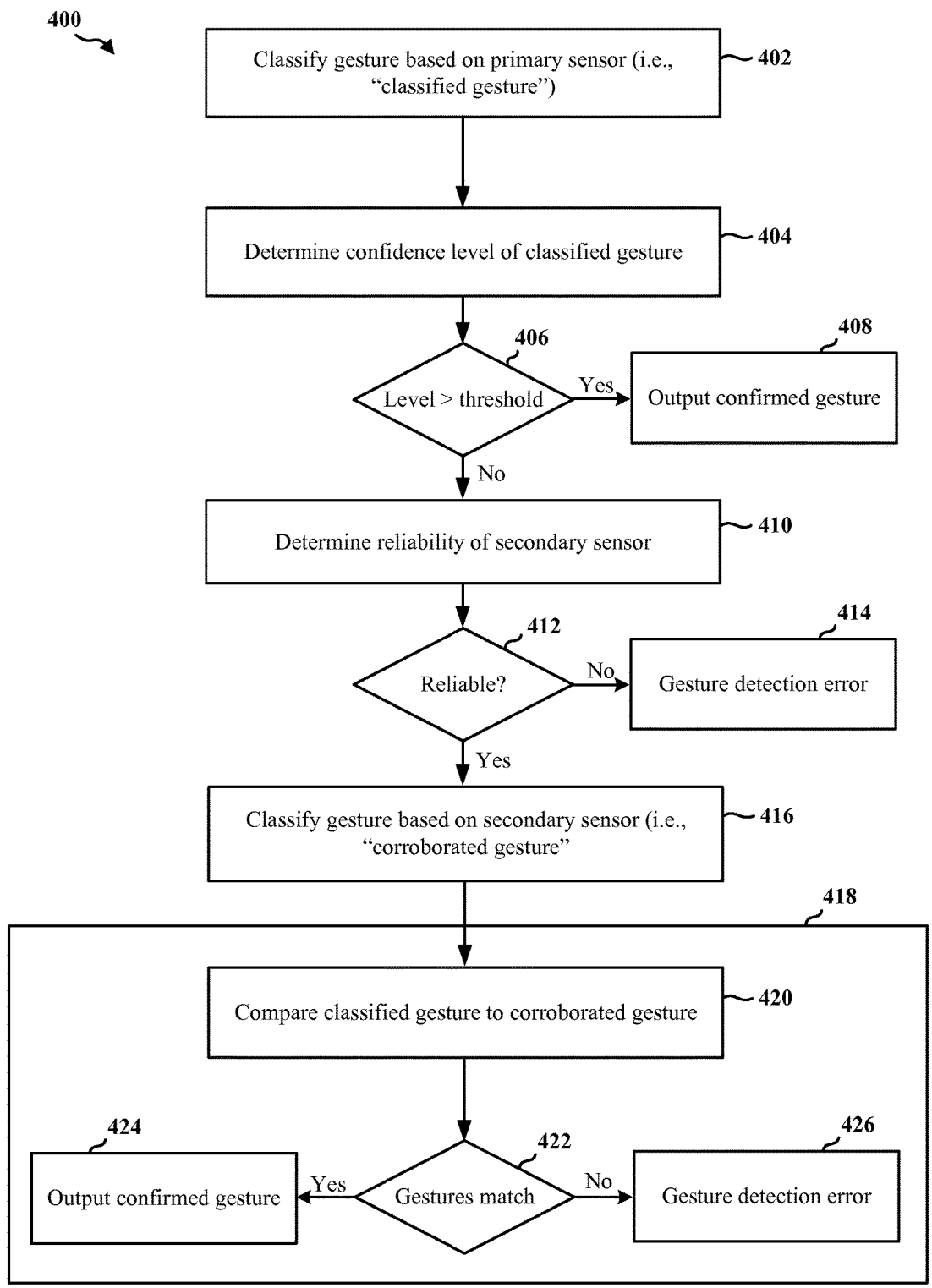
FIG. 4 is a flow chart of a method of gesture recognition.

FIG. 4 is a flow chart of a method of gesture determination. The process is directed toward determining gestures with improved accuracy through use of primary and secondary sensors. The process may be performed by the gesture recognition apparatus 200 of FIG. 2.

At step 402, the apparatus classifies a gesture based on a movement of a body part. The movement of the body part is detected by a primary sensor. More specifically, classifying a gesture may include sensing a motion activity resulting from the movement of the body part, comparing the sensed motion activity to one or more corresponding stored motion activities mapped to a library of gestures, and concluding the body part made the gesture when the sensed motion activity matches the stored motion activity mapped to the gesture.

At step 404, the apparatus may determine the level of confidence that the classified gesture is accurate. In this regard, the classified gesture has an associated confidence level. The confidence level is based on the primary sensor type. In other words, because different sensors may detect certain gestures better than other sensors, each type of sensor, e.g., motion, EMG, pressure, etc., has an associated look up table that maps gestures to confidence levels.

Once the confidence level corresponding to the sensor type and gesture is determined, at step 406, the apparatus compares the confidence level to a threshold. If the threshold is satisfied, then at step 408, the apparatus outputs the classified gesture as a confirmed gesture.

If the threshold is not satisfied, then at step 410, the apparatus initiates a gesture recognition confirmation process, wherein the apparatus determines a reliability level of an available secondary sensor. Determining a reliability level of a secondary sensor may include measuring an environmental condition associated with the secondary sensor. For example, the environmental condition may be one or more of a sound level or a light level. In one implementation, prior to initiating the gesture recognition confirmation process, the apparatus detects for the presence of a secondary sensor.

Once the reliability level is determined, as step 412, the apparatus compares the reliability level to a criterion. For example, in the case of a secondary sensor that is a camera, the reliability level may be a measure of light as measured by a reliability sensor and the criterion may be a threshold light level, such as 500 lumens, that the measured light level must satisfy, e.g., match or exceed. If the criterion is not satisfied, then at step 414, the apparatus outputs a gesture detection error.

If the criterion is satisfied, then at step 416, the apparatus determines a corroborating gesture based on the secondary sensor. More specifically, the apparatus obtains corroborating information associated with the movement of the body part using the secondary sensor and determines a corroborating gesture based on the corroborating information. The corroborating information may be one or more of an image of the body part or a sound emanating from the body part. Determining a corroborating gesture includes comparing the corroborating information to corresponding information mapped to a library of gestures.

At step 418, the apparatus confirms or negates the classification of the gesture based on the corroborating information. More specifically, at step 420, the apparatus compares the classified gesture and the corroborating gesture.

At step 422, if the gestures match, then at step 424, the apparatus outputs a confirmed gesture corresponding to the classified gesture and the corroborating gesture. If the gestures do not match, then at step 426, the apparatus outputs a gesture detection error. Alternatively, the apparatus may process attributes of the classified gesture and one or more corroborating gestures and output a confirmed gesture accordingly. For example, each of the classified gesture and the one or more corroborating gestures may have an associated confidence level. In this case, the apparatus compares the respective confidence levels and outputs the gesture with the highest confidence as the confirmed gesture. As another example, if the respective confidence levels are substantially the same, e.g., within a certain percentage of each other, such as 10%, the apparatus may output a confirmed gesture based on a majority rule, with the gesture indicated most being output as the confirmed gesture.

Figure 5:
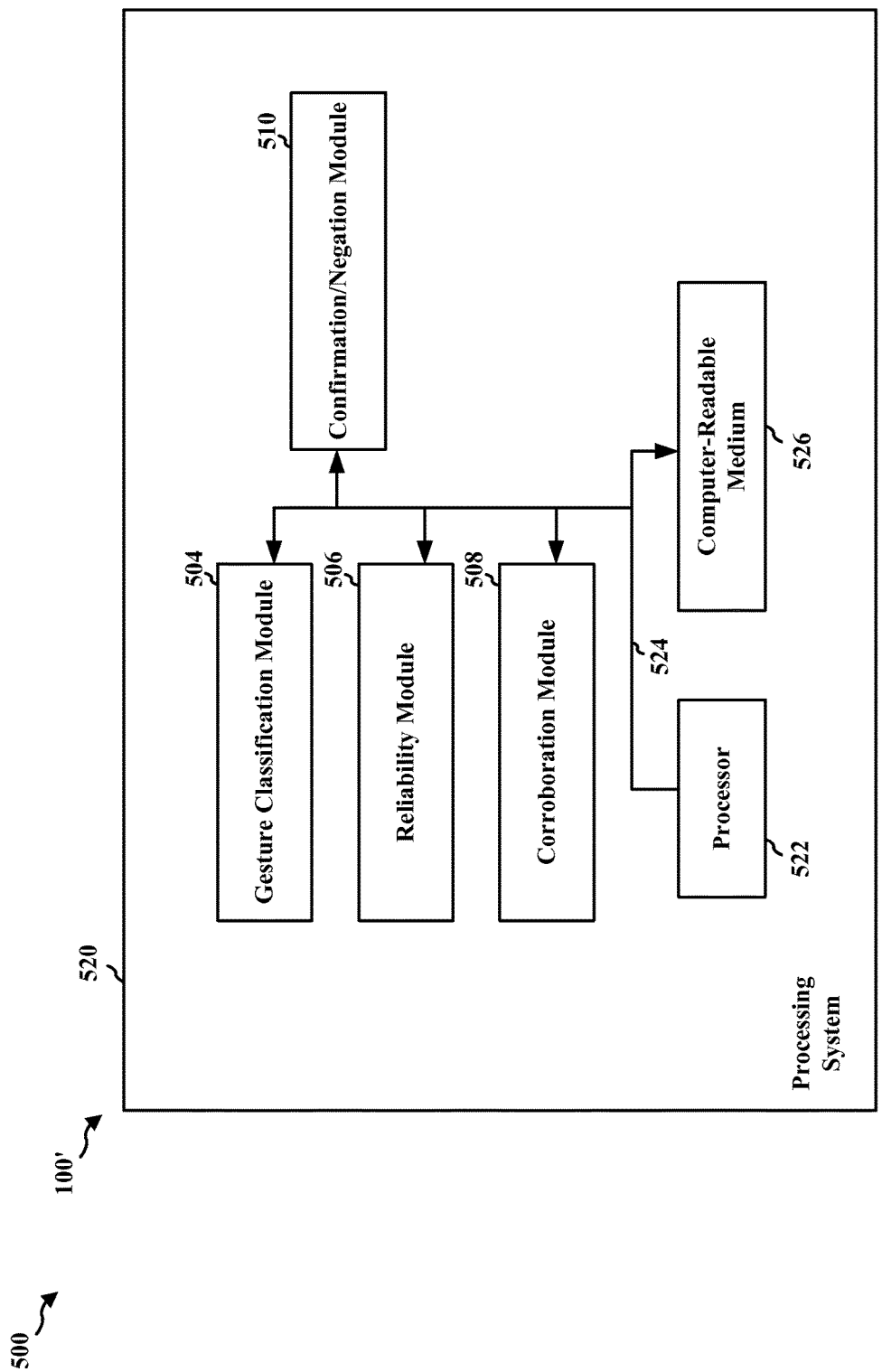
FIG. 5 is a diagram illustrating an example of a hardware implementation for a gesture recognition apparatus employing a processing system.

FIG. 5 is a diagram illustrating an example of a hardware implementation for a gesture recognition apparatus 100' employing a processing system 520. The apparatus includes a gesture classification module 504 that classifies a gesture based on a movement of a body part as detected by a primary sensor, a reliability module 506 that determines a reliability level of a secondary sensor, a corroboration module 508 that obtains corroborating information associated with the movement of the body part using the secondary sensor when the reliability level satisfies a criterion, and a confirmation/negation module 510 that confirms or negates the classification of the gesture based on the corroborating information.

The apparatus 100' may include additional modules that perform each of the steps of the algorithm in the aforementioned flow chart of FIG. 4. As such, each step in the aforementioned flow charts of FIG. 4 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The processing system 520 may be implemented with a bus architecture, represented generally by the bus 524. The bus 524 may include any number of interconnecting buses and bridges depending on the specific application of the processing system 520 and the overall design constraints. The bus 524 links together various circuits including one or more processors and/or hardware modules, represented by the processor 522, the modules 504, 506, 508, 510, and the computer-readable medium/memory 526. The bus 524 may also link various other circuits such as timing sources, peripherals, voltage regulators, and power management circuits, which are well known in the art, and therefore, will not be described any further.

The processing system 520 includes a processor 522 coupled to a computer-readable medium/memory 526. The processor 522 is responsible for general processing, including the execution of software stored on the computer-readable medium/memory 526. The software, when executed by the processor 522, causes the processing system 520 to perform the various functions described supra for any particular apparatus. The computer-readable medium/memory 520 may also be used for storing data that is manipulated by the processor 522 when executing software. The processing system further includes at least one of the modules 504, 506, 508 and 510. The modules may be software modules running in the processor 522, resident/stored in the computer readable medium/memory 526, one or more hardware modules coupled to the processor 522, or some combination thereof.

In one configuration, the apparatus 100/100' for gesture recognition includes means for classifying a gesture based on a movement of a body part detected by a primary sensor, means for determining a reliability level of a secondary sensor, means for obtaining corroborating information associated with the movement of the body part using the secondary sensor when the reliability level satisfies a criterion and means for confirming or negating the classification of the gesture based on the corroborating information.

In some configurations, the gesture has an associated confidence level, in which case the apparatus 100/100' for gesture recognition may further include means for comparing the confidence level to a threshold, and means for performing the determining, the obtaining and the confirming or negating only when the confidence level does not satisfy the threshold.

The apparatus 100/100' for gesture recognition may also include means for detecting for the presence of the secondary sensor prior to performing the determining, the obtaining and the confirming or negating, means for monitoring data from the secondary sensor provided during the movement of the body part, and means for assessing reliability of data provided by the primary sensor based on data provided by the secondary sensor.

The aforementioned means may be one or more of the aforementioned modules of the apparatus 100 and/or the processing system 520 of the apparatus 102' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of gesture recognition, comprising:
   classifying a gesture based on a movement of a body part, the movement detected by a primary sensor, the gesture having an associated confidence level corresponding to a measure of accuracy in classifying the gesture, wherein the associated confidence level of the gesture is based on a look up table including confidence levels corresponding to gestures classified based on movements detected by the primary sensor, the look up table based on a plurality of sensor types corresponding to a plurality of primary sensor types, different gestures corresponding to movements detected by the primary sensor having different confidence levels based on the primary sensor type;
   comparing the associated confidence level to a threshold;
   confirming the classification of the gesture when the associated confidence level satisfies the threshold; and
   performing the following when the associated confidence level does not satisfy the threshold:
      determining a reliability level of a secondary sensor using a reliability sensor, the reliability level providing an indication of whether data from the secondary sensor is reliable;
      when the reliability level satisfies a criterion, activating the secondary sensor to obtain corroborating information associated with the movement of the body part using the secondary sensor; and
      based on a comparison of a confidence level of a gesture classification and confirming the classification of the gesture as the gesture classification with the highest confidence.

2. The method of claim 1, wherein determining a reliability level of a secondary sensor comprises measuring an environmental condition associated with the secondary sensor using the reliability sensor.

3. The method of claim 2, wherein the environmental condition comprises one or more of a sound level or a light level.

4. The method of claim 1, wherein the corroborating information comprises one or more of an image of the body part or a sound emanating from the body part.

5. The method of claim 1, wherein the primary sensor and the secondary sensor are different types of sensors.

6. The method of claim 1, wherein confirming or negating the classification of the gesture comprises:
   determining a corroborating gesture based on the corroborating information; and
   confirming the classification of the gesture when the corroborating gesture matches the classification of the gesture.

7. The method of claim 6, wherein determining a corroborating gesture comprises comparing the corroborating information to corresponding information mapped to a library of gestures.

8. The method of claim 1, wherein classifying a gesture based on movement of a body part as detected by a primary sensor comprises:
sensing a motion activity resulting from the movement of the body part;
comparing the sensed motion activity to one or more corresponding stored motion activities mapped to a library of gestures; and
concluding the body part made the gesture when the sensed motion activity matches the stored motion activity mapped to the gesture.

9. The method of claim 8, further comprising updating the library of gestures when the classification of the gesture is negated based on the corroborating information.

10. The method of claim 9, wherein updating the library of gestures comprises remapping the stored motion activity corresponding to the sensed motion activity to a different gesture, wherein the different gesture corresponds to a corroborating gesture determined based on the corroborating information.

11. The method of claim 1, further comprising detecting for the presence of the secondary sensor prior to performing the determining, the obtaining and the confirming or negating.

12. The method of claim 1, further comprising:
monitoring data from the secondary sensor provided during the movement of the body part; and
assessing reliability of data provided by the primary sensor based on data provided by the secondary sensor.

13. An apparatus for gesture recognition, said apparatus comprising:
means for classifying a gesture based on a movement of a body part, the movement detected by a primary sensor, the gesture having an associated confidence level corresponding to a measure of accuracy in classifying the gesture, wherein the associated confidence level of the gesture is based on a look up table including confidence levels corresponding to gestures classified based on movements detected by the primary sensor, the look up table based on a plurality of sensor types corresponding to primary sensor types, different gestures corresponding to movements detected by the primary sensor having different confidence levels based on the primary sensor type;
means for comparing the associated confidence level to a threshold;
means for confirming the classification of the gesture when the associated confidence level satisfies the threshold; and
means for performing the following when the associated confidence level does not satisfy the threshold:
determining a reliability level of a secondary sensor using a reliability sensor, the reliability level providing an indication of whether data from the secondary sensor is reliable;
activating the secondary sensor to obtain corroborating information associated with the movement of the body part using the secondary sensor when the reliability level satisfies a criterion; and
based on a comparison of a confidence level of a gesture classification and confirming the classification of the gesture as the gesture classification with the highest confidence.

14. The apparatus of claim 13, wherein determining a reliability level of a secondary sensor includes measuring an environmental condition associated with the secondary sensor using the reliability sensor.

15. The apparatus of claim 14, wherein the environmental condition comprises one or more of a sound level or a light level.

16. The apparatus of claim 13, wherein the corroborating information comprises one or more of an image of the body part or a sound emanating from the body part.

17. The apparatus of claim 13, wherein the primary sensor and the secondary sensor are different types of sensors.

18. The apparatus of claim 13, wherein the means for performing is configured to:
determine a corroborating gesture based on the corroborating information; and
confirm the classification of the gesture when the corroborating gesture matches the classification of the gesture, as part of confirming or negating the classification of the gesture.

19. The apparatus of claim 18, wherein the corroborating gesture is determined by comparing the corroborating information to corresponding information mapped to a library of gestures in order to determine the corroborating gesture.

20. The apparatus of claim 13, wherein the means for classifying a gesture based on movement of a body part as detected by a primary sensor is configured to:
sense a motion activity resulting from the movement of the body part;
compare the sensed motion activity to one or more corresponding stored motion activities mapped to a library of gestures; and
conclude the body part made the gesture when the sensed motion activity matches the stored motion activity mapped to the gesture.

21. The apparatus of claim 20, wherein the means for classifying a gesture is configured to update the library of gestures when the classification of the gesture is negated based on the corroborating information.

22. The apparatus of claim 21, wherein the means for classifying a gesture updates the library of gestures by being further configured to remap the stored motion activity corresponding to the sensed motion activity to a different gesture, wherein the different gesture corresponds to a corroborating gesture determined based on the corroborating information.

23. The apparatus of claim 13, further comprising means for detecting for the presence of the secondary sensor prior to performing the determining, the obtaining and the confirming or negating.

24. The apparatus of claim 13, further comprising:
means for monitoring data from the secondary sensor provided during the movement of the body part; and
means for assessing reliability of data provided by the primary sensor based on data provided by the secondary sensor.

25. An apparatus for gesture recognition, comprising:
a memory; and
a processor coupled to the memory and configured to:
classify a gesture based on a movement of a body part, the movement detected by a primary sensor, the gesture having an associated confidence level corresponding to a measure of accuracy in classifying the gesture, wherein the associated confidence level of the gesture is based on a look up table including confidence levels corresponding to gestures that classified based on movements detected by the primary sensor, the look up table based on a plurality of sensor types corresponding to a plurality of primary sensor types, different gestures corresponding to movements detected by the primary sensor having different confidence levels based on the primary sensor type;

compare the associated confidence level to a threshold;

confirm the classification of the gesture when the associated confidence level satisfies the threshold; and perform the following when the associated confidence level does not satisfy the threshold:
- determine a reliability level of a secondary sensor using a reliability sensor, the reliability level providing an indication of whether data from the secondary sensor is reliable;
- activate the secondary sensor to obtain corroborating information associated with the movement of the body part using the secondary sensor when the reliability level satisfies a criterion; and
- based on a comparison of a confidence level of a gesture classification and confirm the classification of the gesture as the gesture classification with the highest confidence.

26. The apparatus of claim 25, wherein the processing system determine a reliability level of a secondary sensor by being configured to measuring an environmental condition associated with the secondary sensor using the reliability sensor.

27. The apparatus of claim 26, wherein the environmental condition comprises one or more of a sound level or a light level.

28. The apparatus of claim 25, wherein the corroborating information comprises one or more of an image of the body part or a sound emanating from the body part.

29. The apparatus of claim 25, wherein the primary sensor and the secondary sensor are different types of sensors.

30. The apparatus of claim 25, wherein the processing system confirms or negates the classification of the gesture by being further configured to:
- determine a corroborating gesture based on the corroborating information; and
- confirm the classification of the gesture when the corroborating gesture matches the classification of the gesture.

31. The apparatus of claim 30, wherein the processing system determines a corroborating gesture by being configured to compare the corroborating information to corresponding information mapped to a library of gestures.

32. The apparatus of claim 25, wherein the processing system classifies a gesture based on movement of a body part as detected by a primary sensor by being configured to:
- sense a motion activity resulting from the movement of the body part;
- compare the sensed motion activity to one or more corresponding stored motion activities mapped to a library of gestures; and
- conclude the body part made the gesture when the sensed motion activity matches the stored motion activity mapped to the gesture.

33. The apparatus of claim 32, wherein the processing system is further configured to update the library of gestures when the classification of the gesture is negated based on the corroborating information.

34. The apparatus of claim 33, wherein the processing system updates the library of gestures by being further configured to remap the stored motion activity corresponding to the sensed motion activity to a different gesture, wherein the different gesture corresponds to a corroborating gesture determined based on the corroborating information.

35. The apparatus of claim 25, wherein the processing system is further configured to detect for the presence of the secondary sensor prior to performing the determining, the obtaining and the confirming or negating.

36. The apparatus of claim 25, wherein the processing system is further configured to:
- monitor data from the secondary sensor provided during the movement of the body part; and
- assess reliability of data provided by the primary sensor based on data provided by the secondary sensor.

37. A non-transitory computer-readable medium storing computer executable code for gesture recognition, comprising code for:
- classifying a gesture based on a movement of a body part, the movement detected by a primary sensor, the gesture having an associated confidence level corresponding to a measure of accuracy in classifying the gesture, wherein the associated confidence level of the gesture is based on a look up table including confidence levels corresponding to gestures that classified based on movements detected by the primary sensor, the look up table based on a plurality of sensor types corresponding to a plurality of primary sensor types, different gestures corresponding to movements detected by the primary sensor having different confidence levels based on the primary sensor type;
- comparing the associated confidence level to a threshold;
- confirming the classification of the gesture when the associated confidence level satisfies the threshold; and
- performing the following when the associated confidence level does not satisfy the threshold:
  - determining a reliability level of a secondary sensor using a reliability sensor, the reliability level providing an indication of whether data from the secondary sensor is reliable;
  - activating the secondary sensor to obtain corroborating information associated with the movement of the body part using the secondary sensor when the reliability level satisfies a criterion; and
  - based on a comparison of a confidence level of a gesture classification and confirming the classification of the gesture as the gesture classification with the highest confidence.

* * * * *